(12) United States Patent
Rudolph et al.

(10) Patent No.: US 11,753,252 B2
(45) Date of Patent: Sep. 12, 2023

(54) MOBILE MACHINE FOR HANDLING AGGREGATE MATERIAL HAVING A MOVABLE COMPONENT CARRIER ABOVE A CONVEYOR LINE

(71) Applicant: Kleemann GmbH, Göppingen (DE)

(72) Inventors: Lars Rudolph, Stuttgart (DE); Emil Scheurer, Wangen (DE)

(73) Assignee: Kleemann GmbH (DE)

(*) Notice: Subject to any disclaimer, the term of this patent is extended or adjusted under 35 U.S.C. 154(b) by 10 days.

(21) Appl. No.: 17/670,579

(22) Filed: Feb. 14, 2022

(65) Prior Publication Data

US 2022/0267099 A1 Aug. 25, 2022

(30) Foreign Application Priority Data

Feb. 24, 2021 (DE) ..................... 10 2021 104 450.2

(51) Int. Cl.
*B65G 41/00* (2006.01)
*B07B 1/00* (2006.01)

(52) U.S. Cl.
CPC ......... *B65G 41/002* (2013.01); *B65G 41/007* (2013.01); *B07B 1/005* (2013.01); *B65G 41/008* (2013.01); *B65G 2201/042* (2013.01)

(58) Field of Classification Search
None
See application file for complete search history.

(56) References Cited

U.S. PATENT DOCUMENTS

| 3,104,037 A | 9/1963 | Myrum |
| 3,439,806 A | 4/1969 | Kass et al. |
| 6,186,338 B1 | 2/2001 | Douglas |

(Continued)

FOREIGN PATENT DOCUMENTS

| DE | 1816165 A1 | 7/1969 |
| DE | 19781758 B4 | 6/1999 |
| DE | 102018009801 A1 | 6/2020 |

OTHER PUBLICATIONS

EP Search Report for corresponding patent application No. 22158097.0, dated Jul. 27, 2022, 10 pages (not prior art).

(Continued)

*Primary Examiner* — Kavel Singh
(74) *Attorney, Agent, or Firm* — Lucian Wayne Beavers; Patterson Intellectual Property Law, PC (57) ABSTRACT

A mobile machine for conveying and/or processing mineral aggregate material, includes a machine frame and a conveyor module supported on the machine frame so as to be displaceable relative to the latter. A conveyor line runs along a virtual conveyor path (FB), the conveyor module being designed at least for conveying the aggregate material along the conveyor path on the conveyor line. A component carrier in a working state of the machine runs in an elevation direction (H) at a distance from the conveyor line crosswise with respect to the conveyor path above the conveyor line. The component carrier supports at least one functional module which interacts with the aggregate material conveyed on the conveyor line. The conveyor module is displaceable relative to the machine frame with a displacement component in the elevation direction. The component carrier is movable both relative to the conveyor module and the machine frame.

6 Claims, 5 Drawing Sheets

(56) References Cited

U.S. PATENT DOCUMENTS 6,877,610 B2 * 4/2005 Boast .................. B07B 1/46
209/412
2020/0384504 A1 12/2020 Rafferty

OTHER PUBLICATIONS

German Office Action for corresponding 10 2021 104 450.2 dated Jul. 15, 2021, 8 pages (not prior art).

* cited by examiner

MOBILE MACHINE FOR HANDLING AGGREGATE MATERIAL HAVING A MOVABLE COMPONENT CARRIER ABOVE A CONVEYOR LINE

BACKGROUND OF THE DISCLOSURE

Field of the Disclosure

The present invention relates to a mobile, in particular self-propelled, machine for conveying and/or processing mineral aggregate material. The machine comprises a machine frame and a conveyor module supported on the machine frame so as to be displaceable relative to the latter, which comprises a conveyor line running along a virtual conveyor path, the conveyor module being designed at least for conveying the aggregate material on the conveyor line along the conveyor path. The machine has a component carrier, which, in a working state of the machine ready for conveying and/or processing aggregate material, runs across the conveyor path above the conveyor line at a distance from the conveyor line in an elevation direction. The component carrier supports at least a functional module, which interacts with the aggregate material conveyed on the conveyor line in a mechanical and/or fluidic and/or radiational and/or acoustic manner. The conveyor module is displaceable relative to the machine frame with a movement component in the elevation direction.

Description of the Prior Art

A mobile machine of this type in the form of a mobile screening plant is known from US 2020/0384504 A1. The known machine has a charging unit, which is loaded with aggregate material by a conveyor device or by a conveyor vehicle. The charging unit passes aggregate material to the conveyor module at a longitudinal charging end of the same, from where the conveyor module conveys the aggregate material to a longitudinal transfer end, at which the conveyor module transfers the aggregate material remaining on the conveyor line to at least one discharge conveyor belt. During the vibrating conveyance along the straight conveyor path, the aggregate material is separated according to particle size by a screen formed on the bottom of the conveyor module. The fractions thus obtained are fed to different discharge conveyor belts and are transported by these away from the screening plant for further processing.

The conveyor line is formed in a trough-like manner and comprises a bottom in the form of a screen, which is bounded on both sides by lateral walls, which form a physical barrier for the aggregate material situated on the conveyor line, so that the aggregate material cannot fall down laterally, but, aside from a sorting movement during screening, moves only along the conveyor line.

For maintenance purposes, the conveyor module including the described trough-like conveyor line may be raised relative to the machine frame by being swiveled about a maintenance swivel axis situated closer to the longitudinal charging end.

Carrier mounts are rigidly connected to the lateral walls of the conveyor line, which protrude upward beyond the edge of the lateral walls. At their longitudinal ends away from the lateral walls, the carrier mounts are connected by a component carrier, which spans the conveyor line essentially parallel to the maintenance swivel axis. In the example of the related art, the component carrier supports a material retardation device in the form of a curtain, which as a mechanical movement resistance is to prevent the aggregate material from moving too fast on the conveyor line.

This component carrier, which in the illustrated example of the related art spans the conveyor line in bridge-like fashion, can result in the following problems: As a screening conveyor module, the conveyor module often forms an assembly that is situated as high as possible on the machine frame, that is, away from the contact subsurface of the machine, so that particle size fractions able to pass through the screen of the conveyor module are able to fall through the screen propelled by the force of gravity, possibly for further sorting in further screening devices. The component carrier may then protrude beyond the conveyor module in the elevation direction to such an extent that the component carrier upwardly exceeds a permissible transport profile of the machine. For transportation, the component carrier must then be removed from the machine.

Furthermore, the component carrier fixed on the lateral walls of the vibrating conveyor module is subjected to stress by the vibrations of the conveyor module, so that it is either able to support only very robust functional modules or must be connected to the lateral walls by interposing an elaborate vibration decoupling device.

If the component carrier via its carrier mounts were not rigidly fastened to the conveyor module itself, but were for example fastened to the machine frame, then the component carrier would not be moved together with the conveyor module and could obstruct the movement of the latter into a maintenance position raised relative to the machine frame. If the component carrier were to be fastened on the machine frame at such a great distance away from the conveyor line in the elevation direction that it would no longer obstruct the lifting of the conveyor module, then there would again be the previously described problem of exceeding the transport profile. Moreover, the component carrier cannot be situated arbitrarily far above the conveyor line without this impairing the fulfillment of the functions of the functional modules situated on the component carrier.

SUMMARY OF THE INVENTION

Starting from what was said above, the objective of the present invention is to develop the machine mentioned at the outset further in such a way that the component carrier in the working state of the machine is in a location above the conveyor line that is optimized for the at least one functional module that it supports. The component carrier is to produce no excessive assembly effort required for transporting and/or maintaining the rest of the machine or the conveyor module.

The present invention achieves this objective in a machine of the species in that the component carrier is situated on the mobile machine so as to be movable both relative to the conveyor module as well as relative to the machine frame. In contrast to the component carrier of the machine known from document US 2020/0384504 A1, which is movable jointly with the conveyor module relative to the machine carrier, but is immovable relative to the conveyor module that supports it, the movability of the component carrier of the presently discussed machine is increased. Being movable both relative to the conveyor module as well as relative to the machine frame, the component carrier is able to be moved in a simple manner between an optimal working position, in which it is in the working state of the machine, and a maintenance position, in which it is for example when the conveyor module is raised relative to the machine frame. The kinematics of the component carrier required for this purpose may be readily ascertained and implemented on the machine on the basis of the movement space of the conveyor module relative to the machine frame and the desired final positions of a movement of the component carrier.

In principle, the component carrier may be movable relative to the machine frame in any way desired, for example displaceable in translatory fashion. Due to the fact that the working environment of the component carrier is frequently subject to mineral dust, the component carrier is preferably swiveling. A swivel bearing requires less space than a translatory movement guidance and may thus be shielded with less effort with respect to a dusty environment than a linear guidance. To ensure the previously mentioned relative movability, the component carrier is preferably situated on the machine frame so as to be swiveling relative to the machine frame about a swivel axis.

In principle, the conveyor module may be any module suitable for conveying aggregate material. The conveyor module may comprise for example a belt conveyor having a perpetually revolving conveyor belt, whose carrying side conveys aggregate material deposited on it along the course of the carrying side. The conveyor module, as that of the related art, preferably comprises a vibrating conveyor, particularly preferably having a conveyor trough running along the conveyor path. Although the conveyor path may be curvilinear, for instance spiral-shaped, it is preferably rectilinear.

Furthermore, the conveyor module preferably fulfills further functions apart from conveying aggregate material along the conveyor path. According to a preferred development of the present invention, the conveyor line comprises a screen, that is, it is also a screening line, along which the aggregate material is separated according particle size. The preferably provided conveyor trough may therefore be designed as a screening conveyor trough in that its bottom is developed at least in sections as a screen.

It is not necessarily the case that the conveyor module and the functional module on the component carrier are the only working modules of the mobile machine, although this shall not be excluded. In addition to the mentioned conveyor module, the machine may comprise at least one further conveyor device, in particular a belt conveyor, and/or at least one further screening device for the further sorting of the aggregate material and/or a crusher module, for instance a cone crusher and/or a jaw crusher and/or an impact crusher, for crushing at least portions of the aggregate material fed into the machine.

The machine is particularly preferably a mobile, in particular self-propelled, screening plant having a charging unit for receiving aggregate material from outside of the machine and for conveying the aggregate material to the longitudinal charging end of the screening conveyor module mentioned above. The screening conveyor module conveys the aggregate material to its opposite longitudinal transfer end, where it transfers the coarser fraction of the conveyed aggregate material that remained on the screening conveyor line to a discharge conveyor device, in particular to a discharge conveyor belt. The finer fraction admitted by the screening conveyor line through its screen openings during the conveyance to the longitudinal transfer end may be conveyed away from the screening plant by a further discharge conveyor device, in particular by a further discharge conveyor belt, or the finer fraction may be separated by at least one further screening device into further fractions according to particle size.

In order to keep the installation space as compact as possible, the at least one further screening device is preferably located below the screening conveyor module, so that the finer fraction able to pass through the screening conveyor module can reach the further screening device propelled by the force of gravity.

To provide operational energy, the mobile machine preferably comprises a power source, preferably an internal combustion engine, particularly preferably a diesel engine. As a preferably self-propelled machine, it has an undercarriage and at least one drive motor. The drive motor may be a hydraulic motor. The required hydraulic pressure is provided by the power source. Although the undercarriage may be a wheeled undercarriage or have at least one wheel, a crawler undercarriage is preferred due to the higher load carrying capacity at the same installation space and the normally roughly textured contact subsurface of the machine in operational use. The undercarriage bears the machine frame above the contact subsurface of the machine.

In principle, it is conceivable for the component carrier to be moved manually by a worker as required. To relieve the personnel working on the machine and to ensure the adjustability of the component carrier, the mobile machine preferably has an adjustment actuator, which is coupled to the component carrier in a manner transmitting movement and power in such a way that the component carrier is drivable by the adjustment actuator to perform an adjustment movement relative to the machine frame and also relative to the conveyor module. Preferably, the adjustment actuator is also coupled to the conveyor module in a manner transmitting movement and power in such a way that the conveyor module is also drivable by the adjustment actuator to perform a displacement movement relative to the machine frame.

Although it is conceivable within the scope of the present invention that one and the same adjustment actuator moves the component carrier and the conveyor module one after another, it is advantageous for shortening the setup and/or maintenance times of the machine, if the movements of the component carrier and the conveyor module effected by the adjustment actuator at least overlap in time. For this purpose, it is preferably provided that an output member of the adjustment actuator is coupled to a linkage or gearing, which is coupled both to the conveyor module as well as to the component carrier in a manner transmitting movement and power so that at least during a period of time of a movement operation of the adjustment actuator both the conveyor module as well as the component carrier are displaced simultaneously. The conveyor module and the component carrier are preferably moved jointly and simultaneously over at least 50%, particularly preferably over at least 80% of the duration of the movement of the conveyor module.

The adjustment actuator may be any type of actuator, for example an electric motor or a pneumatic actuator, for instance a piston-cylinder system. A hydraulic actuator, in particular a hydraulic piston-cylinder system, is preferred as an actuator due to the advantageously high adjustment force relative to the required installation space.

For the explanations of the machine in the present application, the machine shall be thought of as set upon a reference subsurface, which is in this case a level, horizontal contact subsurface that is orthogonal to the direction of the force of gravity. The conveyor module is displaceable relative to the machine frame with a displacement component running in the elevation direction. In the case of a conveyor line running parallel to the reference subsurface, the elevation direction is parallel to the direction of the force of gravity. In the event that the conveyor line is inclined by an angle of inclination relative to the reference subsurface, which is normally the case, for the virtual conveyor path runs in the direction toward the longitudinal transfer end preferably toward the contact subsurface, the elevation direction is inclined by the same angle of inclination with respect to the direction of the force of gravity. The elevation direction, however, runs predominantly along the direction of the force of gravity and is normally inclined with respect to the latter by less than 45°. The conveyor module is therefore also displaceable relative to the machine frame with a displacement component running along the direction of the force of gravity.

The conveyor module may be displaceable relative to the machine frame in translatory fashion. Preferably, it is swivable about a maintenance swivel axis, the conveyor module being hinged on the machine frame particularly preferably in the area of its longitudinal charging end so as to be swivable about the maintenance swivel axis. The maintenance swivel axis preferably runs outside of the conveyor line in an extension area of the conveyor module that is situated closer to the longitudinal charging end than to the longitudinal transfer end.

A combined translatory and rotary displaceability of the conveyor module relative to the machine frame is also conceivable, if the kinematics of the linkage or gearing requires it. However, the merely swiveling motion is preferable due to the robustness of the constructional measures required for its implementation on the machine. This means that preferably the longitudinal transfer end of the conveyor module opposite the longitudinal charging end along the conveyor path has the longest displacement path of all locations of the conveyor module relative to the machine frame. In the working state of the machine, the component carrier is preferably situated closer to the longitudinal transfer end than to the longitudinal charging end.

In principle, the linkage or gearing may comprise a wheel gear. To achieve long displacement and adjustment paths using as few components as possible, the linkage or gearing preferably comprises a lever, which has a hinging section, in which it is hinged on the machine frame so as to be swivable about a hinge axis, and which has a coupling section, in which it is coupled to the conveyor module. The coupling to the conveyor module may be a sliding coupling, so that when the adjustment actuator actuates the lever, the coupling location of the lever with the conveyor module changes, in particular traveling along the conveyor module. Particularly in the preferred use of a piston-cylinder system as the adjustment actuator, the lever is able to lengthen the travel of the adjustment actuator effectively, so that it is advantageously possible to use a short adjustment actuator.

Although it is possible for the component carrier to be connected, preferably via at least one lateral carrier mount, to the lever by a further linkage and/or a further gearing in relative-movable fashion, the component carrier is preferably connected rigidly to the lever for the joint swivel movement about the hinge axis as the swivel axis of the component carrier for reasons of a construction that is as robust as possible and has as few components as possible.

The swivel axis of the component carrier preferably runs orthogonally with respect to the conveyor path and/or orthogonally with respect to the elevation direction and also preferably parallel to the reference subsurface. The swivel axis of the component carrier and the maintenance swivel axis of the conveyor module therefore run preferably in parallel.

Consequently, the mobile machine may be brought into a maintenance state distinct from the working state by relative movement of the conveyor module relative to the machine frame with the movement component in the elevation direction. In this maintenance state, the component carrier may be situated in an area that is no longer above the conveyor line, but is situated along the conveyor path outside of the area of the extent of the conveyor line. It is thus not possible for the component carrier to obstruct a movement of the conveyor module away from the machine frame and a maintenance of the conveyor module from above.

The component carrier may span the conveyor line in bridge-like fashion, which allows for a stable support of the component carrier on carrier mounts on both sides of the conveyor line. Alternatively, the component carrier may be connected to the machine frame in gallows-like fashion only on one side of the conveyor line by a carrier mount and project from the carrier mount over the conveyor line. Though the gallows-like arrangement of the component carrier is less stable than the bridge-like arrangement, it makes it possible, however, on the side of the conveyor line, on which no carrier mount is situated, to move a possibly existing conveyor device, for example a discharge conveyor belt over the conveyor module without obstruction.

For the same purpose, the at least one carrier mount may be designed to be curved and/or kinked in its course from its hinged location on the machine frame or on the lever of the linkage and/or gearing to the component carrier about a curvature or kinking axis that is preferably parallel to the swivel axis of the component carrier. This also makes it possible to create space for the collision-free arrangement of a conveyor device relative to the component carrier. A kink is preferably situated in the half of the at least one carrier mount situated closer to the attachment location on the machine frame or on the lever. In that case, the kink angle may be comparatively small and nevertheless produce a considerable change of the position of the component carrier compared to a rectilinear carrier mount. The kink angle may be between 5° and 25°, for example.

The at least one functional module on the component carrier may be a material retardation device, which is suspended as a curtain, for example a chain curtain or a flap curtain, from the component carrier in the direction of the conveyor line and contacts aggregate material conveyed on the conveyor line, thus decelerating it mechanically. Additionally or alternatively, the functional module may be a spraying device, which for the purpose of reducing dust formation above the conveyor line outputs liquid, preferably water, to the conveyor line, be it as atomized spray, as sprinkling irrigation or as flood discharge. In this case, the functional module is in fluidic interaction with the aggregate material.

The functional module on the component carrier may additionally or alternatively be an illumination device, which illuminates the conveyor line, or may be a camera, which records the conveyor line in the visible wavelength range and/or in the infrared range and transmits the recorded information to a machine operator. The functional module is then in radiational interaction with the aggregate material or the conveyor line.

Further additionally or alternatively, the functional module may comprise a microphone or an ultrasonic sensor, which records the conveyor line and the aggregate material conveyed on it acoustically.

BRIEF DESCRIPTION OF THE DRAWINGS

The present invention is explained in greater detail below with reference to the attached drawings. The figures show.

DETAILED DESCRIPTION

Figure 1:
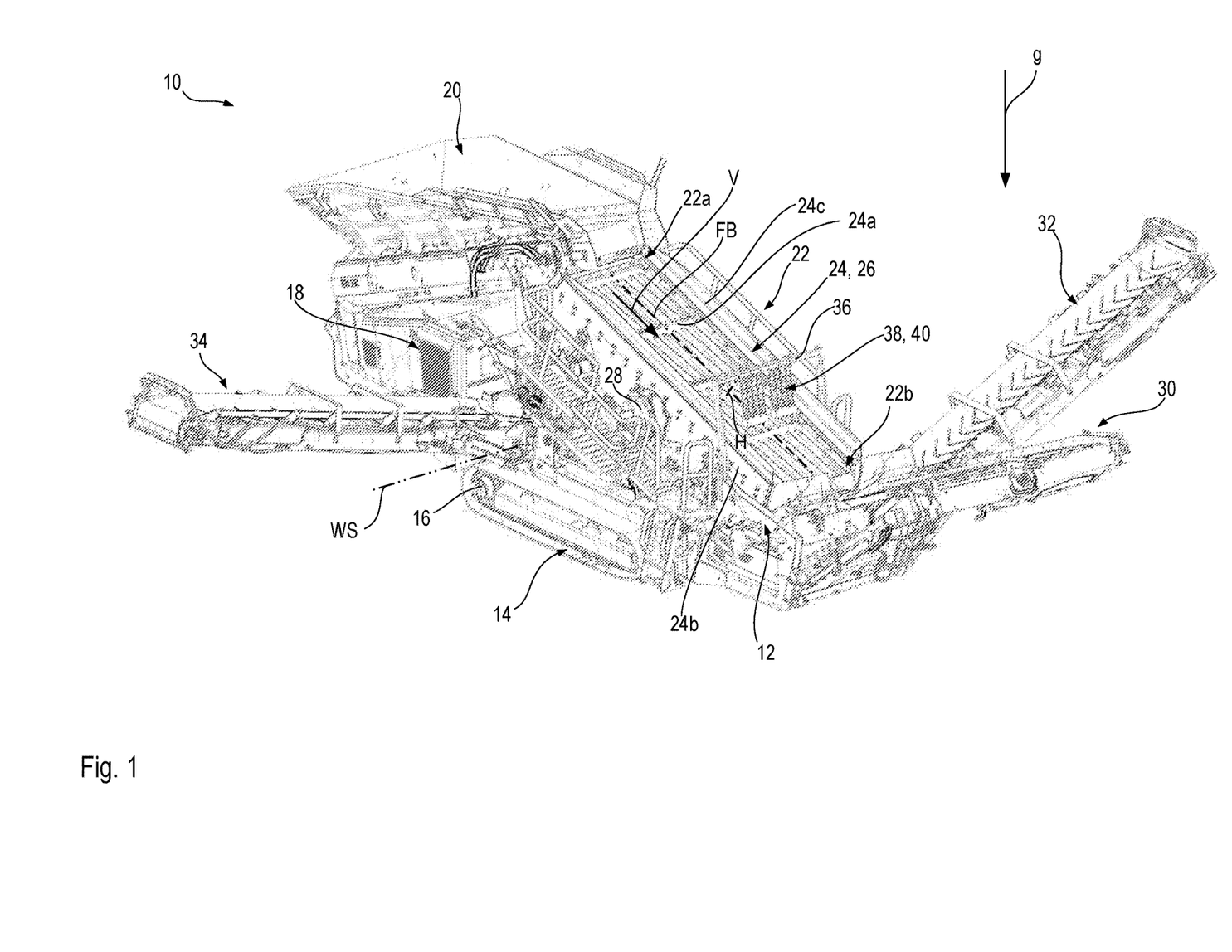
FIG. 1 a schematic perspective view of a self-propelled machine according to the invention in the form of a screening plant in the working state, FIG. 2 an enlarged schematic perspective view of the area of the longitudinal transfer end of the conveyor module of the machine from FIG. 1 in the working state, FIG. 3 an enlarged schematic perspective view of the area of the longitudinal transfer end of the conveyor module of the machine from FIG. 1 in the maintenance state with the conveyor module in the raised position, FIG. 4 a schematic lateral view of the area of the longitudinal transfer end of the conveyor module of the machine from FIG. 1 in the working state, and FIG. 5 a schematic lateral view of the area of the longitudinal transfer end of the conveyor module of the machine from FIG. 1 in the maintenance state.

In FIG. 1, a specific embodiment according to the invention of a mobile machine of the present application is generally denoted by reference numeral 10. Machine 10 is a self-propelled screening plant having a machine frame 12, which is supported by a crawler undercarriage 14, which is driven by a hydraulic motor 16. As source of power for providing the energy required on the machine, the machine comprises an internal combustion diesel engine, not shown in FIG. 1, which is accommodated in an engine compartment 18.

In the working state of machine 10, a charging unit 20 is situated above engine compartment 18, into which conveyor vehicles separate from machine 10, such as excavators or wheel loaders for example, or also a conveyor device separate from machine 10, such as belt conveyors, feed aggregate material, normally mineral aggregate material, such as stone and/or concrete. Charging unit 20, which is a vibrating conveyor device, conveys the aggregate material that is fed into it to a longitudinal charging end 22a of a conveyor module 22 adjacent to charging unit 20. Conveyor module 22 is swivable counterclockwise about a maintenance swivel axis WS relative to machine frame 14 from its working position in the working state of machine 10, shown in FIGS. 1, 2 and 4, into its maintenance position in a maintenance state of machine 10, shown in FIGS. 3 and 5, and is swivable clockwise back into the working position. The maintenance swivel axis WS runs orthogonally with respect to the conveyor path FB, to the elevation direction H explained further below and to the direction of the force of gravity g.

At its longitudinal charging end 22a, conveyor module 22 receives the aggregate material from charging unit 20. Conveyor module 22 comprises a conveyor line 26 in the form of a conveyor trough 24 having a bottom 24a in the form of a screen, in particular a finger screen, and having lateral walls 24b and 24c. A vibration motor 28 is shown on the outside of lateral wall 24b facing away from bottom 24a, which provides the vibration excitation for the conveyor module 22 forming a vibrating conveyor device.

Conveyor module 22 conveys the aggregate material transferred to it at its longitudinal charging end 22a along the virtual conveyor path FB on conveyor line 26 to its opposite longitudinal transfer end 22b, the aggregate material being separated during its movement along conveyor path FB by the screen into two fractions, namely, a coarser fraction, which due to its particle size cannot pass through the openings of the finger screen and therefore remains on conveyor line 26, and a finer fraction, which likewise due to its particle size passes through the openings of the finger screen and reaches at least one further screening device situated below conveyor module 22. The screening devices are situated as so-called "screen decks" in space-saving fashion above or below one another.

The coarser fraction is transferred at longitudinal transfer end 22b from conveyor module 22 to a first discharge conveyor device 30 developed for example as a belt conveyor device. Discharge conveyor device 30 conveys the coarser fraction away from machine 10 for further processing or storage.

In the illustrated example, machine 10 comprises a second discharge conveyor device 32, again by way of example as a belt conveyor device, by which again a coarser portion of the finer fraction of the aggregate material conveyed and screened by screening conveyor module 22 is transported away from machine 10 for further utilization.

A third discharge conveyor device 34 situated closer to the longitudinal charging end 22a of conveyor module 22, again in the form of a discharge belt, is able to transport the finer portion of the finer fraction of the aggregate material conveyed and screened by screening conveyor module 22 away from machine 10 following another screening through the further screen deck 52 situated below screening conveyor module 22 (see FIG. 3). Third discharge conveyor device 34 may be loaded by a transfer conveyor device 54 situated below the further screen deck 52 (see FIG. 3), for example again a belt conveyor device.

In the working state of machine 10 shown in FIG. 1, the longitudinal transfer end 22b is geodetically lower than the longitudinal charging end 22a, so that conveyor line 26 declines along conveying direction V, which supports the conveyance of aggregate material from the longitudinal charging end 22a to the longitudinal transfer end 22b.

Merely for the sake of completeness, it shall be noted that in the illustrated example charging unit 20 conveys the aggregate material fed into it on an incline, that is, uphill.

A component carrier 36 extends transversely across conveyor line 26 at a distance along an elevation direction H that is orthogonal with respect to bottom 24. Elevation direction H is seen most clearly in the lateral view of FIG. 4. As a possible functional module 38, a chain curtain 40 is suspended from component carrier 36 as a material retardation device, in order to decelerate aggregate material conveyed by screening conveyor module 22 through physical contact and avoid excessively high conveyance speeds. Due to the decline of conveyor line 26, elevation direction H is tilted with respect to the direction of the force of gravity g.

Figure 2:
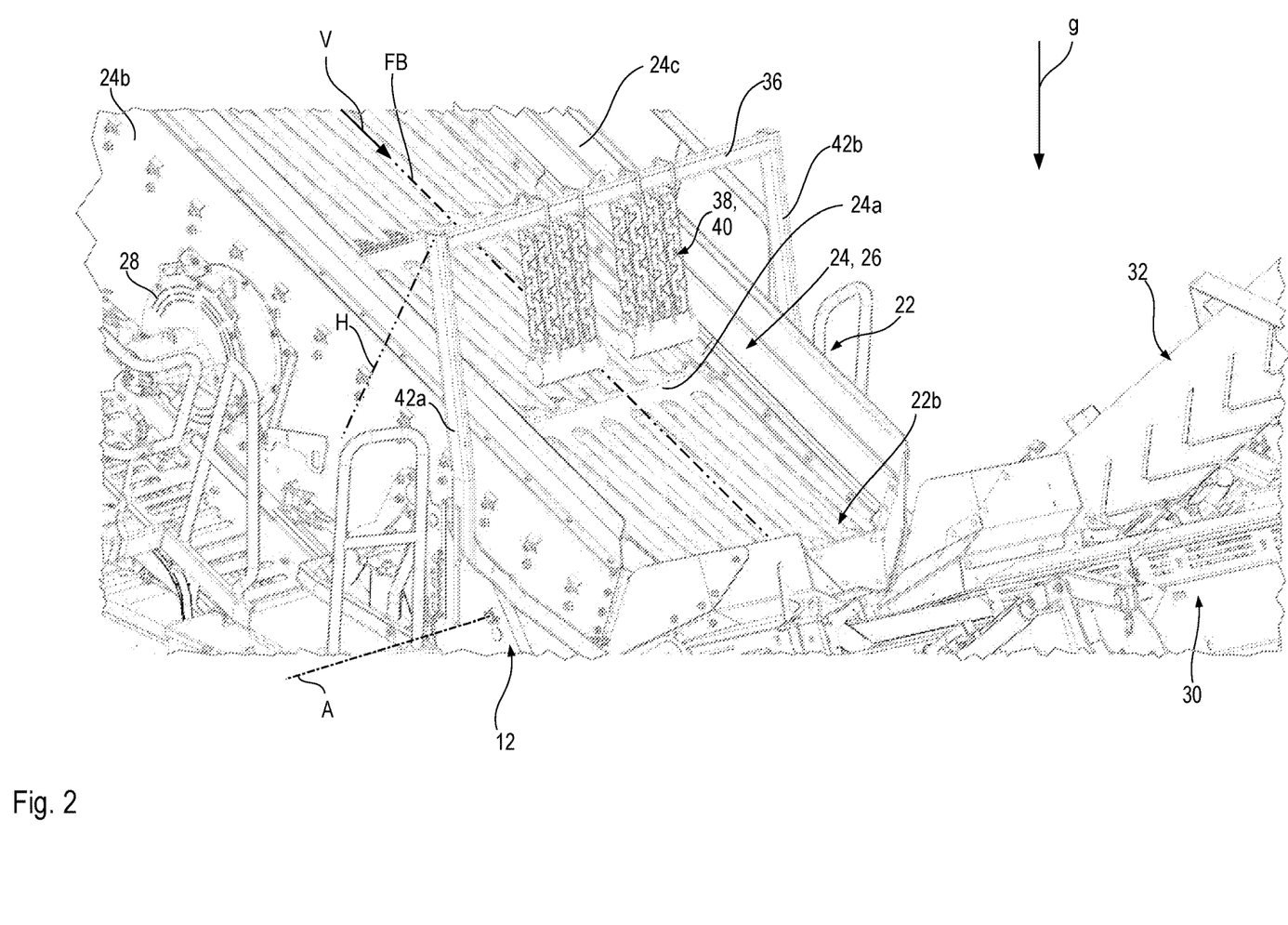
Figure 4:
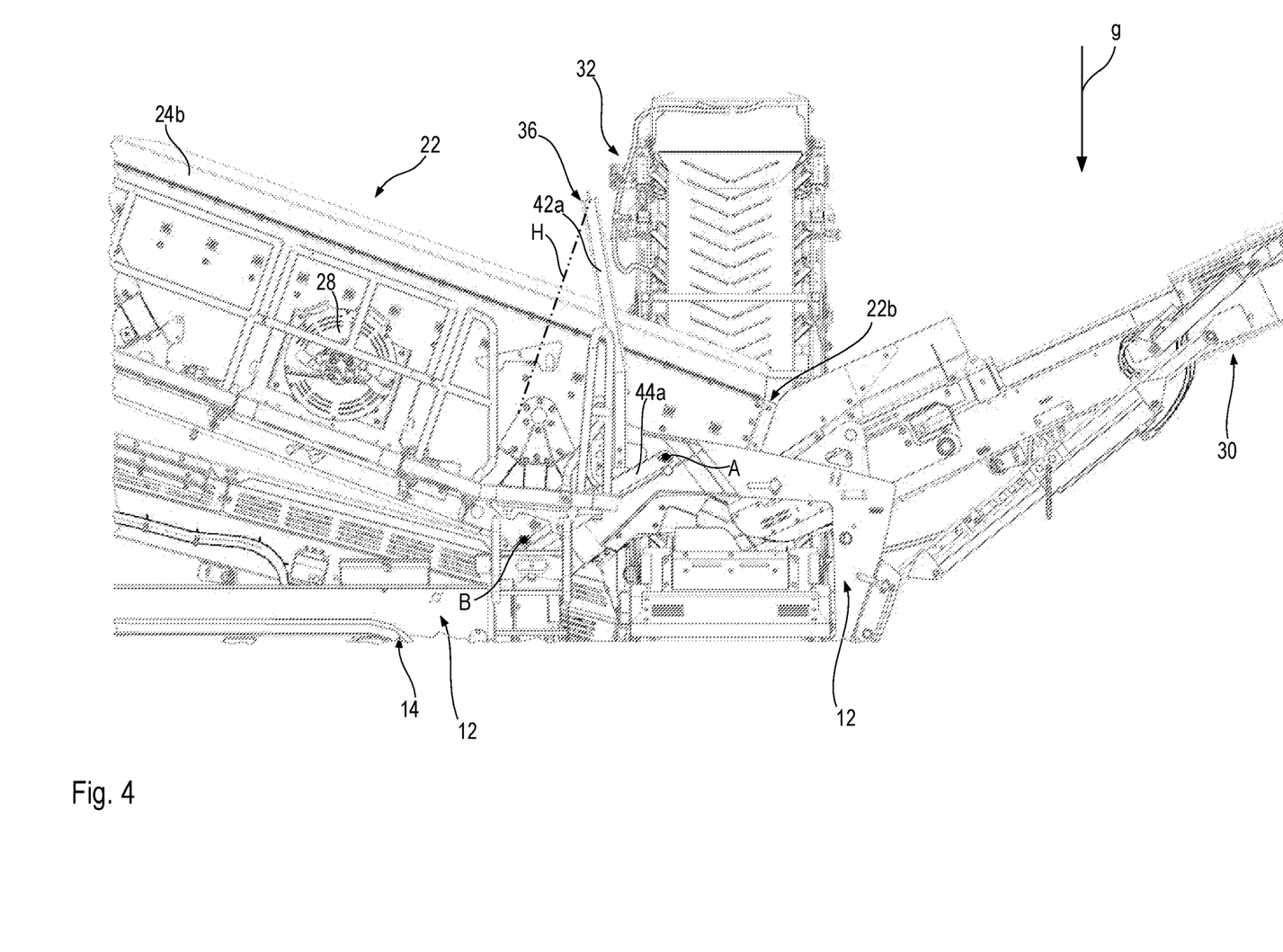
Figure 5:
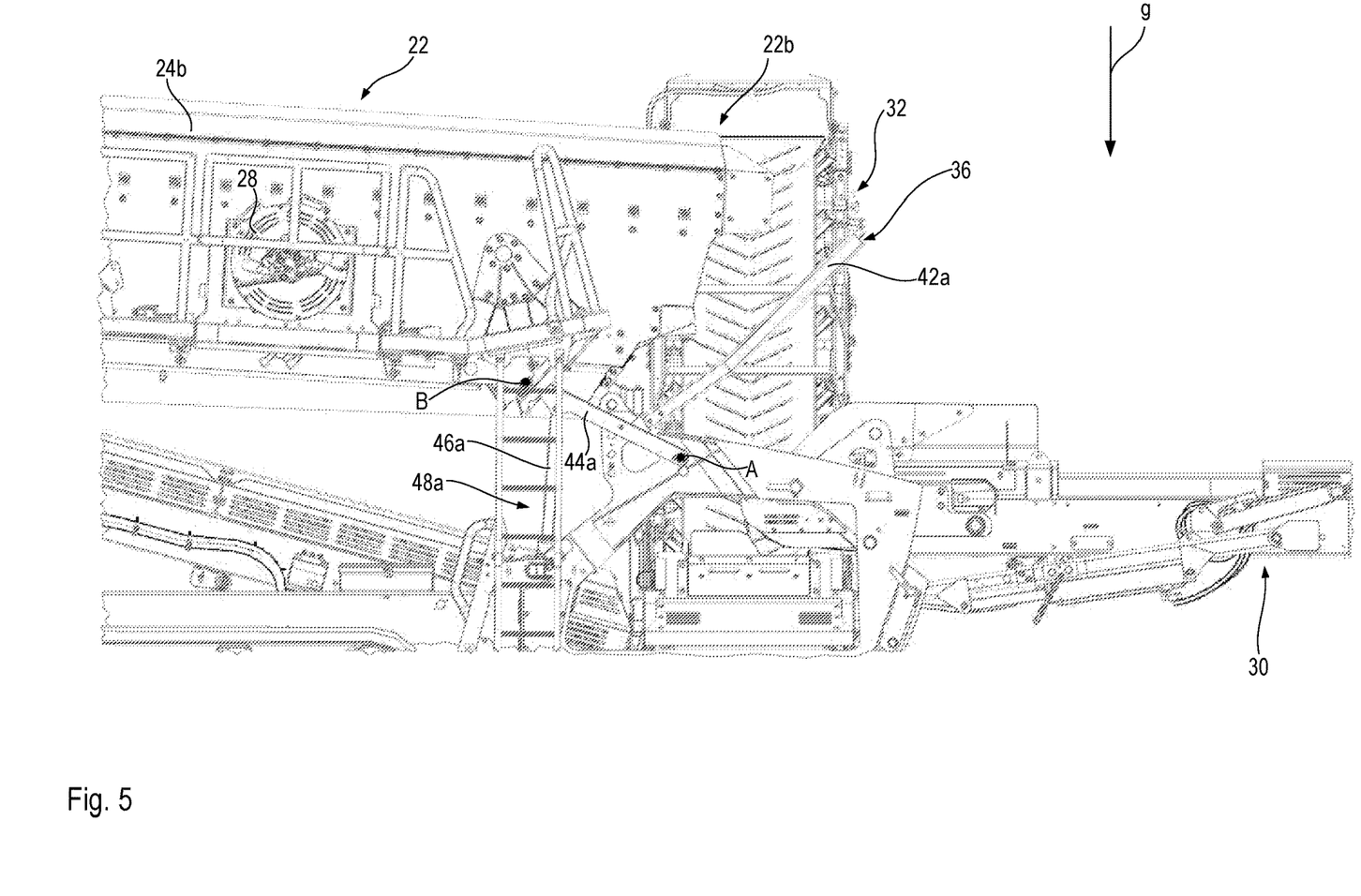

FIG. 2 shows an enlarged illustration of the half of conveyor module 22 that is situated closer to the longitudinal transfer end 22b. Component carrier 36 is hinged on machine frame 12 in swiveling fashion on both sides of conveyor module 22 via respectively one carrier mount 42a and 42b as well as via respectively one linkage lever 44a and 44b (see FIGS. 3, 4 and 5). In a view from outside, levers 44a and 44b are normally concealed by a section of machine frame 12 and not visible. In FIGS. 4 and 5, machine frame 12 is partially cut, so that lever 44a is completely visible.

Levers 44a and 44b are connected to piston rods 46a and 46b, respectively, as output members of actuators 48a and 48b, respectively, in the form of hydraulically operated piston-cylinder systems, so that an extension and a retraction of the piston rods 46a and 46b effects a swivel movement of levers 44a and 44b, respectively, about their hinge axis A shown in FIGS. 2, 4 and 5. More precisely, an extension of the piston rods 46a and 46b in the illustrated example effects a clockwise swivel movement of levers 44a and 44b, respectively, in the view of FIGS. 4 and 5. A retraction of piston rods 46a and 46b accordingly effects a counterclockwise swivel movement of levers 44a and 44b, respectively, in the view of FIGS. 4 and 5. In the illustrated example, hinge axis A is parallel to maintenance swivel axis WS, that is, orthogonal to conveyor path FB and to the direction of the force of gravity g and to elevation direction H. Hinge axis A is orthogonal to the drawing planes of FIGS. 4 and 5.

Relative to a vertical longitudinal central plane of machine 10, the construction of lever 44a, of actuator 48a, and of carrier mount 42a on the one side of machine 10 is mirror-inverted with respect to the construction of lever 44b, of actuator 48b, and of carrier mount 42b on the other side of machine 10 opposite in the lateral sense of machine 10.

Levers 44a and 44b are coupled to conveyor module 22 at the location indicated by B. An extension of piston rods 46a and 46b in the working state of FIGS. 1, 2 and 4 results in a clockwise swivel movement of levers 44a and 44b in the view of FIGS. 4 and 5, whereby the longitudinal transfer end 22b of conveyor module 22 is raised counterclockwise about maintenance swivel axis WS. If necessary, a translatory degree of freedom of motion may be provided at one of the locations A, B or at the swivel bearing about maintenance swivel axis WS. The location "B" may be a straight line extending over at least a portion of the width of conveyor module 22.

Figure 3:
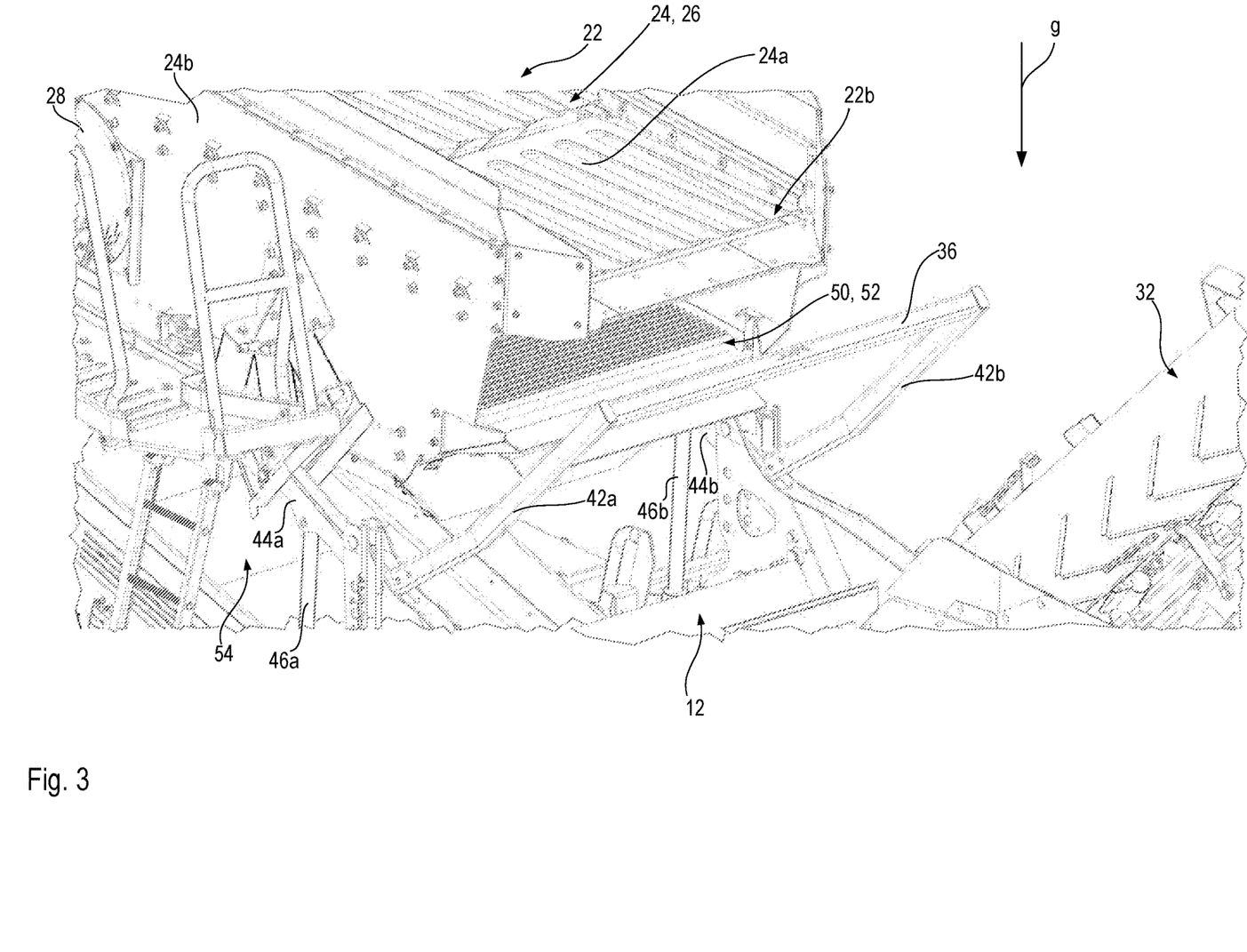

Below conveyor module 22 raised into the maintenance position, FIG. 3 shows the further screening device 50 in a further screen deck 52 situated below conveyor module 22. Likewise visible is the transfer conveyor device 54, in the form of a transfer conveyor belt, which conveys the finest fraction of the aggregate material screened by machine 10, which was able to pass through screening device 50, to discharge conveyor device 34.

Carrier mounts 42a and 42b have a kink in the half of their extension situated closer to levers 44a and 44b respectively connected to them, by which the component carrier 36 is displaced toward the longitudinal charging end 22a in the working state of machine 10, compared to a linear, straight design of carrier mounts 42a and 42b. This allows for a relative movability, free of collision with regard to component carrier 36, in particular an approachability, of discharge conveyor device 32 toward conveyor module 22.

Starting from the respective lever 44a or 44b, the kink is preferably formed in a range from 20% to 40% of the longitudinal extent of carrier mount 42a and 42b, respectively, between the respective lever 44a and 44b and the component carrier 36, particularly preferably in a range from 25% to 40%. The kink angle is between 5° and 25°.

Due to the rigid coupling of component carrier 36 via carrier mounts 42a and 42b to the respective levers 44a and 44b, component carrier 36 is swiveled toward longitudinal transfer end 22b and beyond when conveyor module 22 is raised into its maintenance position by actuators 48a and 48b. Actuators 48a and 48b are joint adjustment actuators of conveyor module 22 and of component carrier 36 in the sense described above in the introduction of the specification.

As shown in particular in the lateral view of FIG. 5, component carrier 36 is located along conveyor path FB outside of the extension range of conveyor module 22 when machine 10 is in its maintenance state with conveyor module 22 in the raised position. In the illustrated example, component carrier 36 is located along conveyor path FB in front of conveyor module 22 and no longer above it. In the elevation direction H, component carrier 36 is located approximately in the extension range of bottom 24a or of lateral walls 24b and 24c.

The fixed physical-mechanical coupling of component carrier 36 to the levers 44a and 44b, which also raise and lower conveyor module 22, makes it possible, in an extremely advantageous manner, for component carrier 36 to be situated in the working state of machine 10 in a position above conveyor line 26 that is optimized for the functional module supported by it, which does not exceed a transport profile. At the same time, conveyor module 22 may be moved without concern for a collision with component carrier 36 between its operating positions of working position and maintenance position, namely, by the actuator system that exists in any case for raising and lowering conveyor module 22, which also adjusts component carrier 36 in a kinematically definite manner.

Hinging piston rods 46a and 46b on levers 44a and 44b, respectively, between hinge axis A and coupling location B, has the effect of gearing up the travel of piston rods 46a and 46b while gearing down the force of the travel stroke.

The invention claimed is:

1. A mobile machine for conveying and/or processing aggregate material, comprising:
   a machine frame;
   a conveyor module supported on the machine frame, the conveyor module including a conveyor line running along a virtual conveyor path, the conveyor module being configured at least for conveying the aggregate material along the virtual conveyor path on the conveyor line;
   a component carrier configured such that in a working state of the mobile machine ready to operate for conveying and/or processing aggregate material the component carrier runs crosswise with respect to the virtual conveyor path and at a distance in an elevation direction above the conveyor line;
   at least one functional module supported from the component carrier and configured to interact with the aggregate material conveyed on the conveyor line in a mechanical and/or fluidic and/or radiational and/or acoustic manner;
   wherein the conveyor module is displaceable relative to the machine frame with a displacement component in the elevation direction; and
   wherein the component carrier is movable both relative to the conveyor module and relative to the machine frame
   further including an adjustment actuator including an output member connected to a linkage or gearing, the linkage or gearing being connected to both the conveyor module and the component carrier such that during a period of time of a movement operation of the adjustment actuator both the conveyor module and the component carrier are simultaneously moved relative to the machine frame; and
   wherein the linkage or gearing includes a lever including a hinging section and a coupling section, the hinging section being connected to the machine frame such that the hinging section can swivel about a hinge axis, and the coupling section being connected to the conveyor module.

2. The mobile machine of claim 1, wherein:
   the component carrier is supported from the machine frame such that the component carrier can swivel about a swivel axis relative to the machine frame.

3. The mobile machine of claim 1, wherein:
the component carrier is rigidly connected to the lever such that the component carrier and the lever can jointly swivel about the hinge axis relative to the machine frame.

4. The mobile machine of claim 1, wherein:
the component carrier is supported from the machine frame such that the component carrier can swivel about a swivel axis relative to the machine frame; and
the swivel axis runs orthogonally relative to the virtual conveyor path and the elevation direction.

5. The mobile machine of claim 1, wherein:
the mobile machine is configured to be brought into a maintenance state distinct from the working state by a movement of the conveyor module relative to the machine frame having a movement component in the elevation direction; and
in the maintenance state the component carrier is situated in an area lying along the virtual conveyor path outside of an extension range of the conveyor line.

6. The mobile machine of claim 1, wherein:
the conveyor line includes a screen configured to separate the aggregate material according to particle size during movement of the aggregate material along the virtual conveyor path.

\* \* \* \* \*